United States Patent
Uttrachi et al.

[15] 3,659,073
[45] Apr. 25, 1972

[54] METHOD OF DC CONSTANT POTENTIAL SUBMERGED ARC WELDING

[72] Inventors: Gerald D. Uttrachi, Westfield; Joseph E. Messina, Roselle, both of N.J.

[73] Assignee: Union Carbide Corporation, New York, N.Y.

[22] Filed: June 8, 1970

[21] Appl. No.: 44,169

[52] U.S. Cl. .................................................. 219/73, 219/131 R
[51] Int. Cl. .................................................................. B23k 9/18
[58] Field of Search ................................................ 219/73, 131

[56] References Cited

UNITED STATES PATENTS 2,532,411  12/1950  Kennedy .............................. 219/130
3,054,884  9/1962  Manz et al. .......................... 219/131

Primary Examiner—J. V. Truhe
Assistant Examiner—George A. Montanye
Attorney—Paul A. Rose, Harrie M. Humphreys, Dominic J. Terminello and Eugene Lieberstein

[57] ABSTRACT

A method of DC constant potential submerged arc welding wherein an inductor is interposed between the constant potential source and the electrode of a magnitude of at least about 1,350 micro-henries and a minimum saturating current level of approximately 500 amperes.

1 Claims, 8 Drawing Figures

CP POWER SUPPLY WITH CONSTANT WIRE FEED

AMPS DCRP

VOLTS

360 AMPS, 35 VOLTS, 12 IPM TRAVEL - 5/32 IN. DIA. WIRE

360 AMPS, 35 VOLTS, 12 IPM TRAVEL – 5/32 IN. DIA. WIRE

VI-1000 POWER SUPPLY WITH CONSTANT WIRE FEED

AMPS DCRP  VOLTS

360 AMPS, 35 VOLTS, 12 IPM TRAVEL - 5/32 IN. DIA. WIRE

METHOD OF DC CONSTANT POTENTIAL SUBMERGED ARC WELDING

This invention relates to direct current submerged arc welding and more particularly to direct current submerged arc welding using a constant potential source of power.

Constant potential (CP) direct current power has almost invariably, due to its simplicity and cost saving factors, been selected over constant current (CC) or conventional power for submerged arc welding applications requiring high travel speeds and high electrode current densities. At reduced electrode current density levels, below 40,000 amps per square inch (770 amps with a 5/32-inch diameter electrode) submerged arc welding using CP operates erratically with large gyrating arc currents causing narrow and peaked weld beads with irregular undercut edges. The welding performance is equally poor for travel speeds below 20 inches per minute. In fact, at travel speeds below 20 inches per minute the resulting welds are narrow and undercut even at high electrode current densities. For some DC submerged arc welding applications it is necessary for the welds to have low penetration (shallow) and/or to be "wide," hereafter defined as having a width greater than about one-half inch, such as for flat fillets and joggle joints. A shallow and/or wide weld usually requires a lower travel speed and/or lower electrode current density. Heretofore, this requirement almost necessarily meant changing over to a constant current source of power with attendant wire feed control.

In accordance with the present invention it has been discovered that the width of the submerged arc welding using constant potential power may be materially and uniformly increased at low electrode current densities by incorporating an inductor having preselected characteristics in series circuit relationship between the constant potential source of power and the electrode. By the judicious selection of inductor characteristics low electrode current density submerged arc welding is rendered possible even at travel speeds as low as 12 inches per minute. Moreover, no noticeable effect was observed on the welding performance at higher speeds and current densities thereby providing a wider range of operation than heretofore possible.

It is therefore the principal object of the present invention to provide a method for DC constant potential submerged arc welding over a relatively wide electrode current density range at travel speeds above a minimum of about 12 inches per minute.

These and other objects and advantages of the present invention will become apparent from the following description and accompanying drawings of which:

FIG. 1 is a diagrammatic illustration of a submerged arc welding set up in accordance with the present invention;

FIGS. 2a and b are comparative oscillograph traces of the welding voltage and current from a conventional submerged arc welding set up using a constant current and constant potential source of power, respectively;

Figure 1:
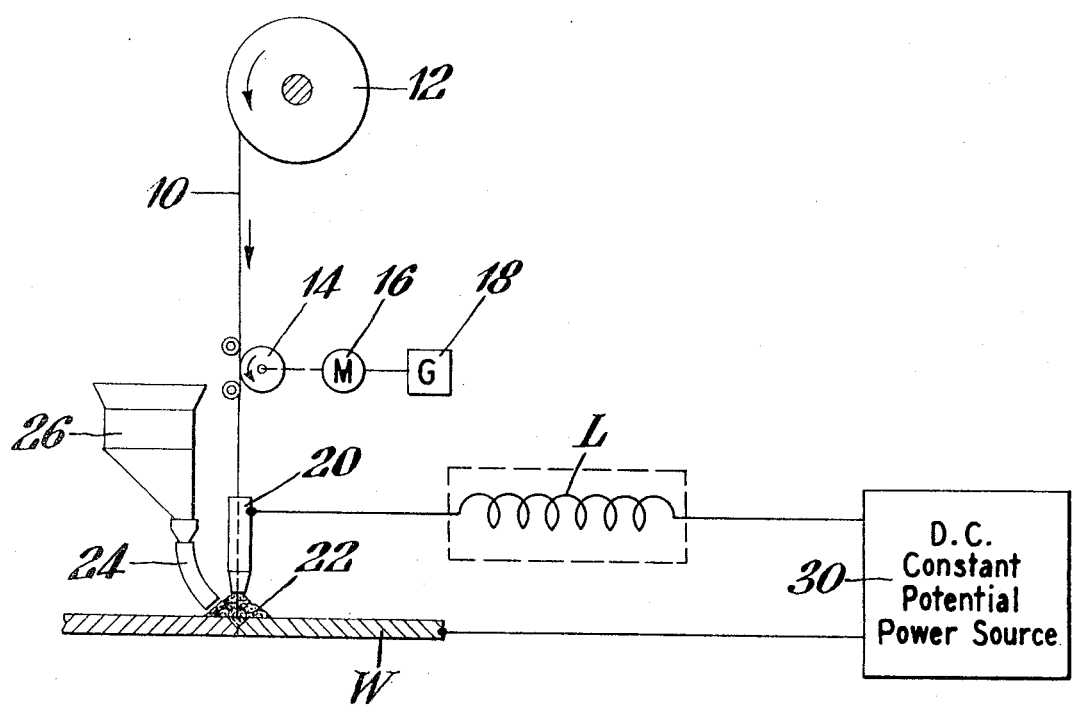

As shown in FIG. 1 of the drawings, a consumable electrode 10 is fed at a substantially constant rate from a reel 12 by a drive wheel 14 which is driven by a motor 16. The speed of motor 16 is selectively controlled by governor 18. Consumable electrode 10 is driven through the torch 20 toward the work W to be welded. The torch 20 is preferably mounted on a carriage or suitable machine (not shown) and adapted to be moved relative to the work W at the desired travel speed of above a minimum of about 12 inches per minute (imp). Granular welding composition 22 is delivered to the welding site by gravity through a pipe 24 from a hopper 26 containing a supply of such composition. The granulated welding flux may be of any conventional type.

Electrode 10 is connected in series circuit relation-ship with inductor L and the constant potential direct current source of power 30. The inductor L is bracketed by dotted lines to indicate that the welding circuit otherwise shown in FIG. 1 is a conventional constant potential direct current submerged arc welding set up. The constant potential source of power 30 may represent either a conventional motor-generator set or combination transformer and circuit means for providing, at it output terminals, a substantially flat voltage characteristic throughout the entire operating range under both load and no-load conditions. For purposes of the present invention the intrinsic inductance of the conventional power source 30 is considered to be zero, since it is negligible relative to inductor L. It should be kept in mind that although inductor L is shown located external of power source 30 it may be packaged within the interior thereof.

Figure 2A:
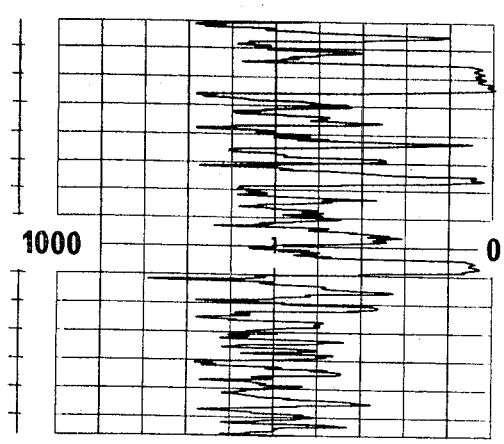
Figure 2A:
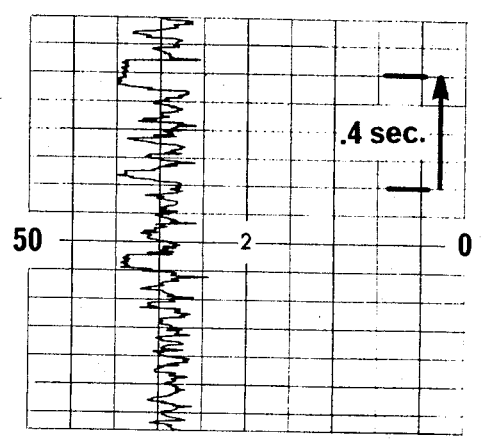
Figure 2B:
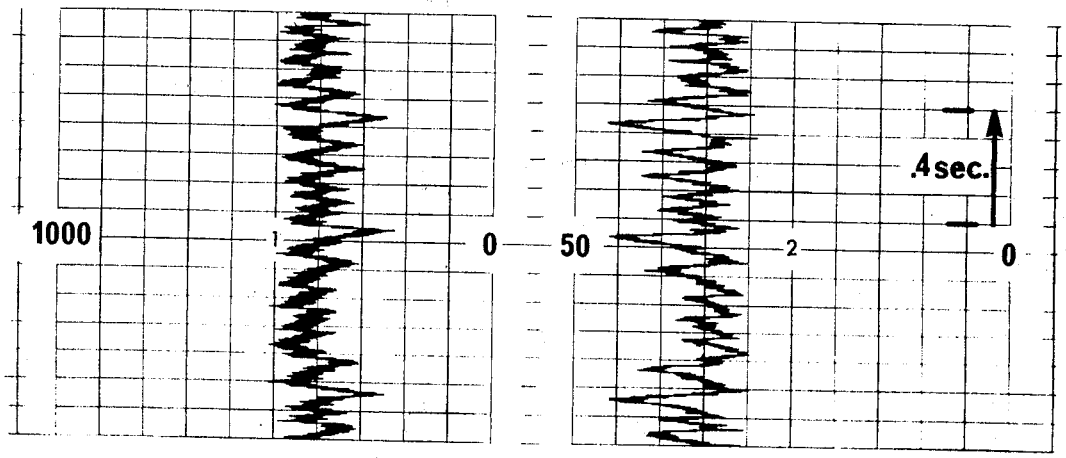

As one tries to weld using a conventional DC submerged arc welding set up, similar to that shown in FIG. 1 without the inductor L, at electrode current densities below 40,000 amps per square inch the welding operation becomes erratic acting progressively worse as the current density is further decreased. Such poor welding behavior also accompanies slow travel speeds of below approximately 20 imp irrespective of the current density. Oscillograph traces of the voltage and amperage recordings from a conventional submerged arc welding set up using a standard direct current constant potential (CP) power source is shown in FIG. 2a. The following welding conditions were selected: 360 amps DCRP, 35 volts, 12 ipm travel speed, and 5/32-inch diameter electrode with a current density of 18,000 amps per square inch. For comparison purposes FIG. 2b shows voltage and amperage recordings at the welding arc using the same set up and welding conditions but with a conventional DC constant current power source and a standard voltage control wire feed speed regulation system. As is readily apparent from FIGS. 2a and b the amperage excursions are quite large with CP and have a relatively high swing frequency as compared to that exhibited by CC. In fact, with CP the current repeatedly approaches zero and remains there on some occasions for a relatively long period of time. On these occasions the arc actually extinguishes, hereinafter referred to as an "arc outage." The combination of gyrating currents and arc outages is believed to cause the erratic performance with CP submerged arc operation under the above noted welding conditions whereas the relatively narrow current fluctuations using the constant current (CC) source produces a stable and mechanically sound weld which is both wider and flatter than that obtained with CP. This was shown to be generally true for low current density operation and/or low travel speed.

The voltage comparison between CP and CC shows simply that the voltage swing with CC is greater than that with CP operation. This should be expected since under CP operation the arc voltage swing is limited at the upper end, without any assistance such as voltage injection, to the open circuit voltage of the supply.

The voltage and current excursions noted and shown in FIGS. 2a and b reflect the mode and uniformity of metal transfer from the electrode to work which in turn is related to the wire size and current magnitude at the arc. As a metal droplet forms and pinches from the electrode the voltage decreases and the current increases.

Figure 3:
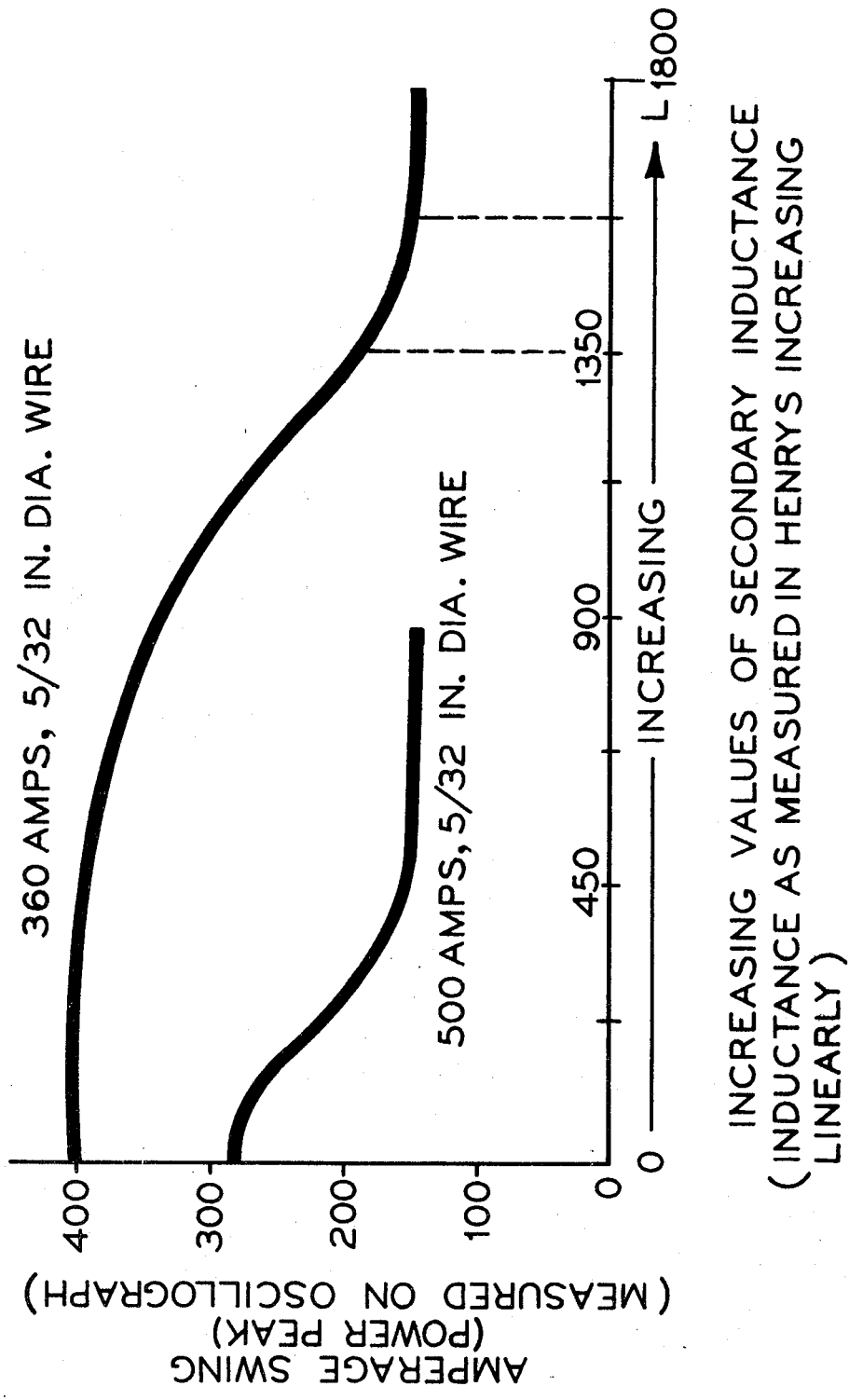
FIG. 3 is a graph of current swing versus inductance for two (2) levels of operating current under otherwise identical submerged arc welding conditions.

The addition of inductance to the DC welding circuit has been found to reduce the current swings at low electrode current densities. The relationship between current swing in the DC submerged arc welding set up shown in FIG. 1 and the magnitude of inductance L for two levels of operating current at otherwise identical welding conditions is shown in FIG. 3. The amperage swings were measured from oscillograph traces on a peak to peak basis at varying levels of inductance. The upper graph shows that with a current density of 18,000 amps per square inch the amperage swing begins to level out at 1,350 micro-henries. At the higher current density, 30,000 amps per square inch lower graph, the amperage swing begins to level out at 450 micro-henries. Although the simple solution of adding inductance will reduce the current swing it does not necessarily prevent arc outages nor does it necessarily provide the increased width and uniformity desired for the resulting weld bead.

What in fact was discovered as necessary was the selection of inductance in micro-henries at a saturation current level of above a predetermined minimum amount. If the saturating current level of the inductor L is too low for the operating current involved, arc outages result and the weld bead appears narrow and undercut. On the other hand, if the magnitude of inductance is too low the current swing will be relatively large and concomitantly at higher frequency resulting likewise in poor welding performance. Choosing the optimum magnitude of inductance at the minimum possible saturating current level for the desired operating current range to provide quality welds over a wide current density and travel range in somewhat empirical. Table I, shown below, is a tabulation of results obtained by varying the magnitude of inductor L at different minimum saturation current levels using the following welding conditions: 350 amps, 35 volts, 12 ipm, 5/32-diameter wire, and any conventional flux.

TABLE I

| Inductance | Minimum Saturation Current | Finished Weld Characteristics |
|---|---|---|
| A. 900 | 1,000 | edge slightly irregular, not too stable, oscillograph trace showed that arc outages were present |
| B. 1,450 | 580 | excellent |
| C. 300 | 800 | poor, very unstable |
| D. 400 | 150 | poor, very unstable |
| E. 2,600 | 450 | good |

Extrapolation from Table I combined with various oscillograph traces (not shown) established that the minimum acceptable saturation current level is approximately 500 amperes and that the minimum acceptable magnitude of inductance is about 1350 micro-henries to permit submerged arc DC welding at current densities above 11,000 amperes per square inch for minimum travel speeds of about 12 inches per minute.

Figure 4:
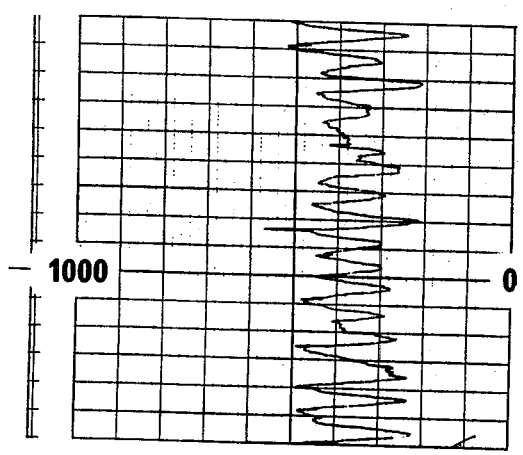
FIG. 4 is an oscillograph trace of the welding voltage and current of the submerged arc welding set up shown in FIG. 1.
Figure 4:
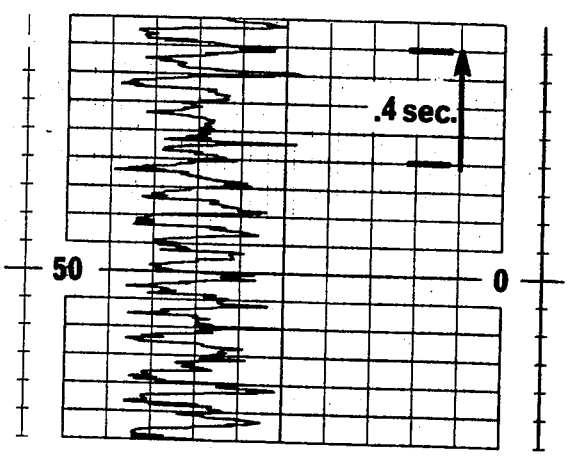

FIG. 4 shows the voltage currents trace for the welding set up of FIG. 1 using the characteristics of inductor B from Table I for inductor L and at the following welding conditions: 360 amps, 35 volts at a travel speed of 12 ipm and a 5/32 -inch electrode.

It can be seen that all arc outages have been eliminated and amperage excursions are much lower than conventional CP (FIG. 2a) and similar to those obtained with standard CC power (FIG. 2b).

Partial penetration welds were made in 3/8-inch plate in a square butt joint spaced ⅝ inches to illustrate the differences between welds made with conventional CC, CP and the CP power system of the subject invention respectively. The welding parameters for all the power systems were as follows: 370 amps DCRP, 35 volts, 12 ipm travel speed. All welds were made with a general purpose fused flux and a 5/32-inch diameter electrode.

The weld made with the standard CP system has irregular undercut edges with a peaked weld crown. The welds made with the CC and the subject CP system of the present invention are similar; both have uniform undercut free weld edges and flat weld crowns. Welds made with the CC and the subject power system are 10 percent wider than the conventional CP power weld. The weld penetration is approximately the same for all welds.

Welds of the type described are useful for making the bottom passes in multipass welds to avoid burning through manual weld root passes or poorly fit joints. The use of the large diameter electrode allows the welding current to be raised to 700 to 1,000 amperes for subsequent fill passes to increase welding speeds. When wide, shallow penetration welds are required, such as employed for lap or joggle joints; large diameter electrodes operating at low current densities are also useful.

The present submerged system which embodies the arc welding inductor L has been found to be capable of providing satisfactory welds on a 3/16-inch diameter electrode at welding currents as low as 300 amperes, 35 volts, at 12 ipm (11,000 amps/inch$^2$).

What is claimed is:

1. In a process of electric arc welding wherein an arc is established under a blanket of welding flux composition between a consumable electrode and a workpiece from a source of direct current constant potential power, said electrode being fed toward the work at a substantially constant rate, the improvement of which comprises; adding an inductor of at least about 1,350 microhenries in series circuit relationship between the constant potential source of power and the electrode, which inductor has a minimum saturating current level of approximately 500 amperes and supplying welding current at levels as low as 300 amperes to said electrode at a current density above 11,000 amperes per square inch while maintaining a relative travel speed between the electrode and work above a minimum of about 12 inches per minute.

* * * * *